United States Patent
Kezerian

[15] 3,692,901
[45] Sept. 19, 1972

[54] CERTAIN SUBSTITUTED PHOSPHORUS CONTAINING ALKYL THIO METHYL CARBOXYLATES AND THEIR USES AS INSECTICIDES AND ACARICIDES

[72] Inventor: Charles Kezerian, Orinda, Calif.

[73] Assignee: Stauffer Chemical Company, New York, N.Y.

[22] Filed: Sept. 2, 1970

[21] Appl. No.: 69,095

Related U.S. Application Data

[62] Division of Ser. No. 681,576, Nov. 8, 1967, Pat. No. 3,562,362.

[52] U.S. Cl. .................424/212, 424/203, 424/210, 424/211
[51] Int. Cl. .............................................A01n 9/36
[58] Field of Search..............424/210, 211, 212, 203

[56] References Cited

UNITED STATES PATENTS

3,297,520  1/1967  Dickhaeuser et al.......424/211
3,396,212  8/1968  Sakai et al. .................424/211

*Primary Examiner*—Albert T. Myers
*Assistant Examiner*—Frederick E. Waddell
*Attorney*—Wayne C. Jaeschke and Edwin H. Baker

[57] ABSTRACT

Certain substituted phosphorus containing alkyl thio methyl carboxylates of the formula

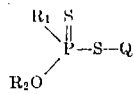

in which $R_1$ is alkyl or alkoxy and $R_2$ is alkyl, Q is:

(1)

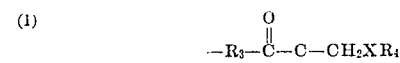

in which $R_3$ is alkylene, $C_1$—$C_4$;
X is sulfinyl or thio and
$R_4$ is alkyl, $C_1$—$C_4$; or (2)

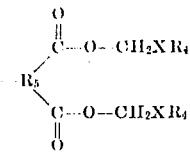

in which

X and $R_4$ are as defined and $R_5$ is a trivalent saturated hydrocarbon, $C_1$—$C_3$; or (3)

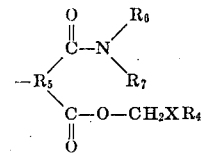

in which

X, $R_4$ and $R_5$ are as defined and $R_6$ and $R_7$ are hydrogen, alkyl $C_1$—$C_6$, aryl, halo or cyano substituted alkyl or aryl, or tetrahydro furfuryl or when $R_6$ and $R_7$ are taken together, an alkylene, $C_2$—$C_6$, ethyleneoxyethylene or ethylenethioethylene groups; or (4)

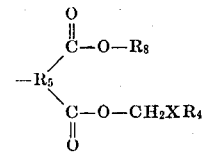

in which

X, $R_4$ and $R_5$ are as defined and $R_8$ is alkyl $C_1$ or $C_2$ or halogen, aryl, haloaryl substituted derivatives thereof; or (5)

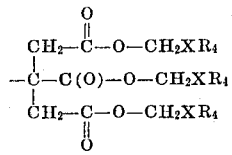

in which

X and $R_4$ are as defined are used as insecticides and acaricides.

16 Claims, No Drawings

CERTAIN SUBSTITUTED PHOSPHORUS CONTAINING ALKYL THIO METHYL CARBOXYLATES AND THEIR USES AS INSECTICIDES AND ACARICIDES

This application is a division of copending application, Ser. No. 681,576, filed Nov. 8, 1967, now U.S. Pat. 3,562,362.

This invention relates to certain novel phosphorus containing alkyl thio methyl carboxylates compounds and to their uses as insecticides and acaricides.

More specifically, this invention pertains to compounds of the formula

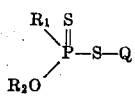

in which $R_1$ is selected from the group consisting of alkyl having from 1 to 4 carbon atoms, preferably from one to two carbon atoms; an alkoxy having from one to four carbon atoms, preferably from one to two carbon atoms, and most preferably ethoxy;

$R_2$ is an alkyl group having from one to four carbon atoms, preferably from one to two carbon atoms, and most preferably ethyl;

Q is selected from the group consisting of:

(A)

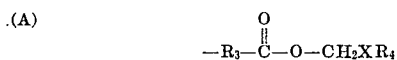

$R_3$ is an alkylene group having from one to four carbon atoms, preferably from one to two carbon atoms, X is selected from the group consisting of thio and sulfinyl, preferably thio, $R_4$ is an alkyl group having from one to four carbon atoms, preferably from one to two carbon atoms;

(B)

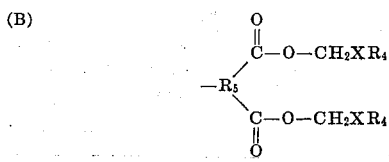

in which
X and $R_4$ are defined as above and $R_5$ is a trivalent saturated hydrocarbon group having from one to three carbon atoms, preferably from one to two carbon atoms;

(C)

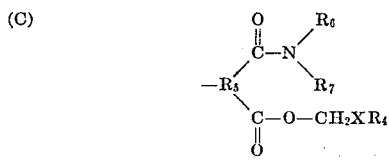

in which X, $R_4$ and $R_5$ are defined as above and $R_6$ and $R_7$ are independently selected from the group consisting of hydrogen; alkyl having from one to six carbon atoms and aryl, preferably phenyl, substituted derivatives thereof wherein the substituents are selected from the group consisting of halogen, preferably chloro, and cyano; and tetrahydrofurfuryl and when $R_6$ and $R_7$ are taken together, a member selected from the group consisting of alkylene having from two to six carbon atoms, ethyleneoxyethylene, and ethylenethioethylene; and (D)

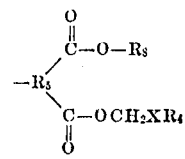

wherein X, $R_4$ and $R_5$ are defined as above and $R_8$ is selected from the group consisting of alkyl having from 1 to 6 carbon atoms, and substituted derivatives therein in which said substituents are selected from the group consisting of halogen, preferably chlorine, aryl, preferably phenyl, and haloaryl, preferably chlorophenyl; and (E)

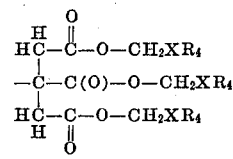

in which X and $R_4$ are defined as above.

The compounds of this invention can be prepared by various processes which are also features of this invention. In the following formulas $R_1$, $R_2$, $R_3$, $R_4$, $R_5$, $R_6$, $R_7$ and $R_8$ are as previously defined and K is an alkali metal and Hal is chloro or bromo radical, preferably chloro.

A. Compounds of the formula

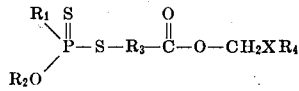

can be prepared in two steps according to the following general reaction:

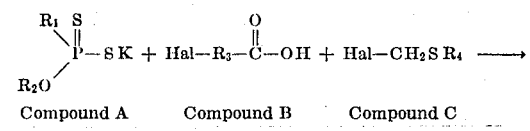

More specifically, in step 1, Compound A can be reacted with Compound B and then the intermediate reaction product, in step 2, can be reacted with Compound C. In the alternative, Compound B can be reacted with Compound C and the intermediate reaction product, in a second step, can be reacted with Compound A.

B. By another process, compounds of the formula

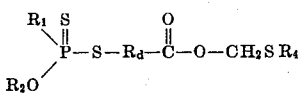

in which $R_d$ is alkylene radical having from two to three carbon atoms can be prepared in two steps by the following general reaction:

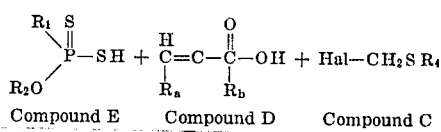

Compound E    Compound D    Compound C in which $R_a$ and $R_b$ are selected from the group consisting of methyl provided that both $R_a$ and $R_b$ can not be methyl. More specifically, in step 1, Compound E can be reacted with Compound D and the intermediate reaction product can be reacted, in step 2, with Compound C. In the alternative, Compound C can be reacted with Compound D and then the intermediate reaction product, in a second step, reacted with Compound E.

C. Compound of the formula

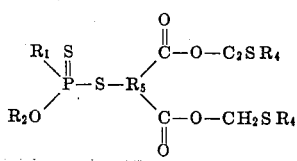

can be prepared in two steps according to the following general equation:

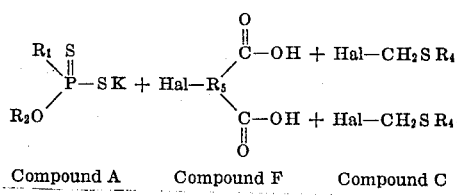

Compound A    Compound F    Compound C

More specifically, the above reactions can be carried out by reacting Compound A with Compound F, in step 1, and then reacting, in step 2, 1 mole of the intermediate reaction product thereof with 2 moles of Compound C. In the alternative, 1 mole of Compound F can be reacted with 2 moles of Compound C and then, as a second step, the intermediate reaction product thereof can be reacted with Compound A.

D. Alternatively, compounds of the formula

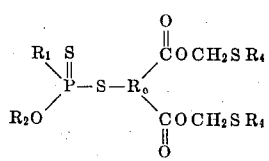

in which $R_c$ is a trivalent saturated hydrocarbon group having from two to three carbon atoms, can be prepared in two steps according to the following general equation:

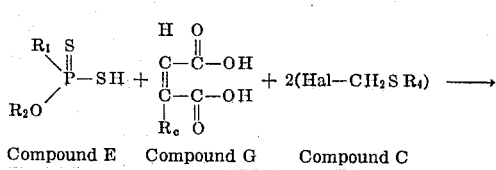

Compound E    Compound G    Compound C in which $R_c$ of Compound G is selected from the group consisting of hydrogen and methyl.

Accordingly, in step 1 Compound E can be reacted with Compound G and then 1 mole of the intermediate compound formed thereby can be reacted with 2 moles of Compound C, in a second step. In the alternative, 2 moles of Compound C can be reacted with Compound G in a first step and the reaction product thereof can be reacted with Compound E.

E. Compound of the formula

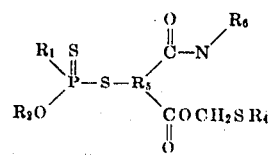

can be prepared by the processes described in part (C) with the exception that a compound of the formula

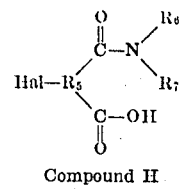

Compound H is substituted for Compound D or by the processes described in part (D) with the exception that a compound of the formula

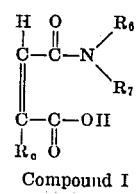

Compound I is substituted for Compound G. Compound H and I can be prepared by well known procedures, for example, by reacting a compound of the formula

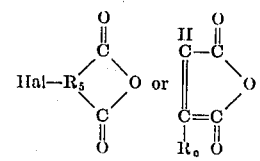

respectively, with an amine of the formula

(F) Compound of the formula

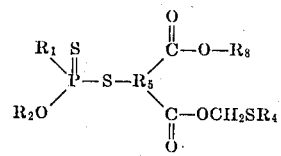

can be prepared by the processes described in part (C) with the exception that a compound of the formula

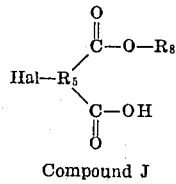

Compound J is substituted for Compound D; or they can be prepared by the processes described in Part (D) with the exception that a compound of the formula

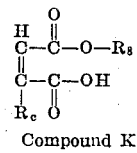

Compound K is substituted for Compound G. Compounds J and K can be prepared by well known procedures by reacting a compound of the formula

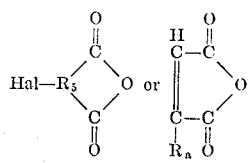

respectively, with an alcohol of the formula R₈OH (G) Compounds of the formula

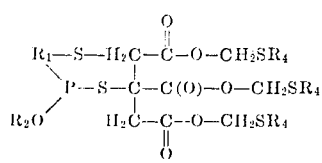

can be prepared in two steps according to the following general equation:

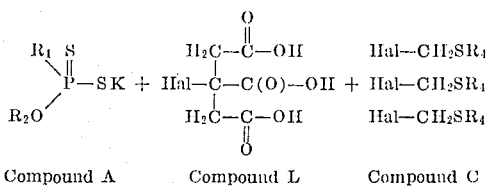

Compound A    Compound L    Compound C

Accordingly, Compound A can be reacted with Compound L in a first step and then 1 mole the intermediate reaction product produced thereby reacted with 3 moles of Compound C. In the alternative, 3 moles of Compound C can be reacted with 1 mole of Compound L in a first step and then the intermediate reaction product produced thereby reacted with Compound A.

All the reactions set out above between Compound C with a compound or intermediate reaction product containing one or more carboxylic acid moieties are preferably carried out in a solvent and in the presence of an HCl or HBr acid acceptor which are well known in the art. The reaction can proceed without heating or the reactions are exothermic, however, heating between about 50° to 80° C. is preferable as such reduces the reaction time.

In those reactions in which Compound A or Compound E is a reactant the reaction proceeds readily with heating between about 50° C. and 80° C. in a solvent.

All of the reactions set out above should be carried out under anhydrous conditions. Examples of solvents are acetone, ether, halogenated hydrocarbons such as carbon tetrachloride, or a liquid aliphatic or aromatic hydrocarbon, such as hexane, benzene, xylenes or the like. The addition reactions to unsaturated compounds in some cases proceed vigorously, usually after an induction period of a few minutes. These addition reactions are preferably effected initially at below about 40° C., with the reaction mixture eventually being heated at about 60° C. for several hours to insure completion of the reaction. Reactions involving evolution of a hydrogen chloride or hydrogen bromide are, preferably effected in the presence of a hydrogen chloride or hydrogen bromide acceptor, such as an organic tertiary nitrogen base such as pyridine or preferably triethylamine or K₂CO₃. Bases which form a salt and water with the hydrogen chloride or bromide should not be used as water has a deleterious effect on the reactions.

When the reactions are complete, any precipitate formed can be filtered off and any solvent or other volatile material removed by distillation.

The compounds of subdivision A through F of the preceeding processes can be converted to their sulfinyl derivatives by reacting them with an oxidizing agent such as hydrogen peroxide preferably in the presence of a solvent such as glacial acetic acid. This reaction can be carried on conveniently at room temperature with cooling. Thus as a result of this conversion, the moiety —CH₂SR₄ of these compounds is oxidized to the

moiety.

The compounds of this invention can be prepared in accordance with the teaching of the following illustrative examples:

EXAMPLE I

Methylthiomethyl, 2-(O,O′ diethyl phosphosdithio) 1-methyl propionate.

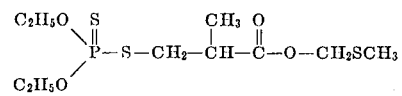

41.3 g. (0.135 M) of B(O,O′ diethylphosphorodithio) 1 methyl propionic acid and 150 ml. acetone was treated with 13.5 g. (0.14 M) monochlorodimethyl sulfide. While stirring at 20°C., 13.6 g. (0.135 M) triethylamine was added and the mixture stirred for 30 minutes, then refluxed 30 minutes. Benzene 200 ml. was added with sufficient water to separate the organic layer. This was washed with 5% HaHCO₃ then water, dried over anhydrous magnesium sulfate, then distilled under vacus to remove solvent and volatile. There was obtained 31.g. of yellow oil with an N_D^{30} of 1.5160 and Infra red spectra corresponds to the above structure.

EXAMPLE II

Bis methylthiomethyl, α (O,O′ diethylphosphorodithio)

succinate.

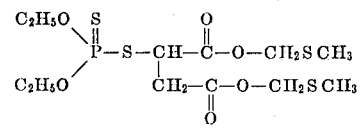

11.8 g. (0.05 M.) of bis methylthiomethyl maleate and 12 g. (0.065 M) O,O′ diethylphosphoro dithioic acid and a trace of hydroquinone were heated to 60° – 65° C. for 16 hours. The mixture was diluted with 100 ml benzene and washed with 5% HaHCO₃ solution, then with water. The organic layer was dried over anhydrous magnesium sulfate, then distilled under vacuo to remove solvent and volatiles. There was obtained 17 g. of a yellow oil having an $N_D^{30}$ of 1.5344. Infra red spectra of the sample corresponds to the above structure. Calc. For $C_{12}H_{23}O_6PS_4$; C34.2, H 5.46, P 7.32; Found C 33.71, H 5.74, P 8.62.

EXAMPLE III

N,N dimethyl, methylthiomethyl,α(O,O' diethylphosphorodithio) succinanate.

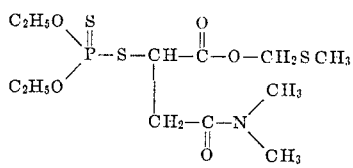

33 g. (0.1 mole) of N N dimethylα(O,O' diethylphosphoro dithio) succinamic acid and 13.9 g. (0.1 mole) $K_2CO_3$ were added to 100 ml. acetone. Monochlorodimethyl sulfide 9.6 g. (0.1 mole) was added, and the mixture stirred overnight, and finally refluxed for 2 hours, Benzene 200 ml. was added with sufficient water to separate the organic layer. This was washed with water, 5% NaOH, again with water, then dried over anhydrous $M_gSO_4$ and distilled under vacuo (below 45° C.) to remove solvent and volatiles. There was obtained 30 g. of a tan oil $N_D^{30}$ 1.5250. Infra red corresponds to the above structure. Calc for $C_{12}H_{24}NO_5PS_3$ C 37.0; H 6.22; P 7.96; N 3.6; S 24.65 Found C 38.61; H 6.59; P 8.11; N 3.12; S 25.41.

EXAMPLES IV

N,N dimethyl, methyl sulfinylmethyl, α (O,O' diethylphosphorodithio) succinanate.

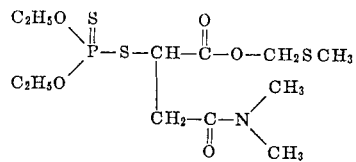

30 g. (0.08 mole) N,N dimethyl, methylthiomethyl, α (O,O' diethylphosphorodithio) succinamate in 100 ml. glacial acetic acid was treated dropwise over 1 hour with 9 ml. (0.08 mole) 30% $H_2O_2$, keeping at room temperature with cooling. Stir overnight at room temperature. Benzene 300 ml. and water 500 ml. were added. Separate the organic layer and wash with water till the washings are neutral, then dried over anhydrous Mg.$SO_4$ filtered and distilled under vacuum to remove solvent and volatile. A low yield 12 g. of yellow oil was obtained $N_D^{30}$ 1.5248. Infra red corresponds to the above structure, with a strong sulfoxide bond at 10.90 cm$^{-1}$.

EXAMPLE V

Ethyl, methylthiomethyl,α(O,O' dimethylphosphorodithio) succinate.

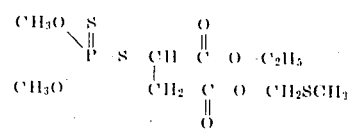

13 g. (0.063 M) of ethyl, methylthiomethyl maleate and 11 g. (0.07 M) of O,O'dimethylphosphorodithioic acid were mixed with 100 ml. benzene and stored for 2 days. The mixture was washed with 5% HaHCO$_3$ solution, then with water. The organic solution was dried over anhydrous magnesium sulfate and distilled under vacus to remove solvent and volitiles. There was obtained 12.5 g. of a yellow oil, with an $N_D^{30}$ of 1.5169. Infra red spectra corresponds to the above structure. Calc. for $C_{10}H_{19}O_6PS_3$; P 8.55, S 26.5; Found P 8.24 S 26.77.

Table I through Table V contains other compounds of this invention that can be prepared by the procedures described in Examples I–V.

TABLE I $$\begin{array}{c} R_1 \quad S \quad\quad\quad O \\ \diagdown \| \quad\quad\quad \| \\ P-S-R_3-C-O-CH_2XR_4 \\ \diagup \\ R_2O \end{array}$$

| Compound number | $R_1$ | $R_2$ | $R_3$ | X | $R_4$ | $n_D^{30}$ |
|---|---|---|---|---|---|---|
| 1 | Ethoxy | Ethyl | —CH$_2$— | S | Methyl | 1.5214 |
| 2 | do | do | —CH$_2$CH$_2$— | S | do | 1.5212 |
| 3 | do | do | $\begin{array}{c}CH_3\\|\\-CHCH-\end{array}$ | S | do | 1.5140 |
| 4a | do | do | $\begin{array}{c}CH_3\\|\\-CH_2CH-\end{array}$ | S | do | 1.5160 |
| 5 | do | do | $\begin{array}{c}CH_3\\|\\-CH_2CH-\end{array}$ | $\begin{array}{c}O\\\uparrow\\S\end{array}$ | do | 1.5260 |

TABLE II $$\begin{array}{c} R_1 \quad S \quad\quad\quad C-O-CH_2XR_4 \\ \diagdown \| \quad\quad\quad \| \\ P-S-R_5 \quad\quad O \\ \diagup \quad\quad\quad C-O-CH_2XR_4 \\ R_2O \quad\quad\quad \| \\ \quad\quad\quad\quad\quad O \end{array}$$

| Compound number | $R_1$ | $R_2$ | $R_5$ | X | $R_4$ | $n_{D30}$ |
|---|---|---|---|---|---|---|
| 6b | Ethoxy | Ethyl | $\begin{array}{c}-CH-\\|\\CH_2-\end{array}$ | S | Methyl | 1.5344 |
| 7 | Methoxy | Methyl | $\begin{array}{c}-CH-\\|\\CH_2-\end{array}$ | S | do | 1.5580 |

TABLE III

Table III—Continued

| Compound number | $R_1$ | $R_2$ | $R_3$ | X | $R_4$ | $R_6$ | $R_7$ | $n_D^{30}$ |
|---|---|---|---|---|---|---|---|---|
| 8c | Ethoxy | Ethyl | CH$_2$—<br>\|<br>—CH— | S | Methyl | Methyl | Methyl | 1.5250 |
| 9d | do | do | CH$_2$—<br>\|<br>—CH | O↑S | do | do | do | 1.5248 |
| 10 | do | do | CH$_2$—<br>\|<br>—CH— | S | do | n-Butyl | n-Butyl | 1.5110 |
| 11 | do | do | CH$_2$—<br>\|<br>—CH— | O↑S | do | do | do | 1.5120 |
| 12 | do | do | CH$_2$—<br>\|<br>—CH$_2$— | S | do | (cyclohexyl ring) | | 1.5305 |
| 13 | do | do | CH$_2$—<br>\|<br>—CH— | O↑S | do | (cyclohexyl ring) | | 1.5346 |
| 14 | do | do | CH$_2$—<br>\|<br>—CH— | S | do | Methyl | Phenyl | 1.5518 |
| 15 | do | do | CH$_2$—<br>\|<br>—CH— | O↑S | do | do | do | 1.5509 |
| 16 | do | do | CH$_2$—<br>\|<br>—CH— | S | do | (morpholine ring with O) | | 1.5343 |
| 17 | do | do | CH$_2$—<br>\|<br>—CH— | S | do | Hydrogen | t-Butyl | 1.5164 |
| 18 | do | do | CH$_2$—<br>\|<br>—CH— | O↑S | do | (morpholine ring with O) | | 1.5322 |
| 19 | do | do | CH$_2$—<br>\|<br>—CH— | S | do | (cyclopentane ring) | | 1.5271 |
| 20 | do | do | CH$_2$—<br>\|<br>—CH— | O↑S | do | (tetrahydrofuran-like ring) | | -------- |
| 21 | do | do | CH$_2$<br>\|<br>—CH— | S | do | CH$_2$CH$_2$—C$_2$H$_4$OCH$_3$ | CH$_2$CH$_3$—C$_2$H$_4$OCH$_3$ | 1.5126 |
| 22 | do | do | CH$_2$<br>\|<br>—CH— | S | do | Cyclohexyl | Cyanoethyl | 1.5269 |
| 23 | do | do | CH$_2$<br>\|<br>—CH— | S | do | Cyanoethyl | do | 1.5318 |
| 24 | do | do | CH$_2$—<br>\|<br>—CH— | O↑S | do | Cyclohexyl | do | 1.5259 |

TABLE IV

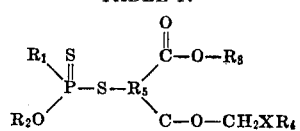

| Compound number | $R_1$ | $R_2$ | $R_5$ | X | $R_4$ | $R_8$ | $n_D^{30}$ |
|---|---|---|---|---|---|---|---|
| 25e | Methoxy | Methyl | CH$_2$—<br>\|<br>CH | S | Methyl | Ethyl | |
| 26 | Ethoxy | Ethyl | CH$_2$<br>\|<br>CH | S | do | do | 1.5120 |
| 27 | do | do | CH$_2$—<br>\|<br>—CH— | O↑S | do | do | 1.5195 |
| 28 | do | do | CH$_2$—<br>\|<br>—CH— | S | do | —CH$_2$CH$_2$Cl | 1.5213 |
| 29 | do | do | CH$_2$<br>\|<br>—CH— | S | do | Phenyl | 1.5409 |

TABLE IV—Continued

| Compound number | R₁ | R₂ | R₃ | X | R₄ | R₈ | $n_D^{30}$ |
|---|---|---|---|---|---|---|---|
| 30 | do | do | CH₂—<br>\|<br>—CH— | $\overset{O}{\underset{S}{\updownarrow}}$ | do | do | 1.5456 |
| 31 | do | do | CH₂—<br>\|<br>—CH— | S | do | 4-chlorophenyl | 1.5486 |
| 32 | do | do | CH₂—<br>\|<br>—CH— | $\overset{O}{\underset{S}{\updownarrow}}$ | do | do | 1.5517 |

TABLE V

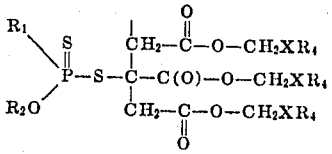

| Compound Number | R₁ | R₂ | X | R₄ | $n_D^{30}$ |
|---|---|---|---|---|---|
| 33 | Ethoxy | Ethyl | S | Methyl | | a—Prepared in Example I.
b—Prepared in Example II.
c—Prepared in Example III.
d—Prepared in Example IV.
e—Prepared in Example V.

As previously stated the compounds of this invention are useful as insecticides, especially systemic type insecticides.

Insecticidal Evaluation Test. The housefly (HF) *Musca domestica* (Linn.) was subjected to evaluation tests for insecticides incorporating the compounds of the present invention.

Twenty-five female flies, 3 to 5 days old, were caged in cardboard mailing tubes 3-⅛ inch in diameter 2-⅝ inch tall. The cages were supplied with cellophane bottoms and coarse mesh nylon tops. Each cage was provided with food and water. The candidate toxicant was dissolved in a volatile solvent, preferably acetone. The solution was pipetted into a Petri dish bottom, allowed to air dry and placed in a cardboard mailing tube cage. The flies were continuously exposed to the known residue of the active compound in the cage. After 24 and 48 hours, counts were made to determine living and dead insects. The LD–50 values were calculated using well known procedures. The results of this insecticidal evaluation test is given in Table II under HF. The Lygus bug (LB) *Lygus hesperus* was treated similarly as the houseflies, except 10 to 25 insects well used per cage. The caged insects were sprayed with the candidate compounds at various concentrations. After 24 and 72 hours, counts were made to determine living and dead insects. The LD–50 (percent) values were calculated. These values are reported under the column LB in Table II.

The insect species bean aphid (BA) *Aphis fabae* — was also employed in the test for insecticidal activity. Young nasturtium plants were used as the host plants for the bean aphid. The host plant was infested with approximately 50 of the aphids. The test chemical was dissolved in acetone, added to water which contained a small amount of Sponto 221, an emulsifying agent. The solution was applied as a spray to the infested plants. Concentrations ranged from 0.05 percent downward until an LD₅₀ value was achieved. These results are given in Table II under the column BA.

Acaricidal Evaluation Test. The two-spotted mite(2SM), *Tetranychus telarious* (Linn.), was employed in tests for miticides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v/v Sponto 221, polyoxy-ethylene ether sorbitan monolaurate, an emulsifying agent, the amount of water being sufficient to give concentrations of active ingredient ranging from 0.25 to 0.0008 percent. The test suspensions were then sprayed on the infested pinto bean plants. After 7 days, mortalities of post-embryonic and ovicidal forms were determined. The percentage of kill was determined by comparison with control plants which had not been sprayed with the candidate compounds. The LD–50 value was calculated using well-known procedures. These values are reported under the columns 2SM-PE and 2SM-Eggs in Table VI.

Systemic Evaluation Test. This test evaluates the root absorption and upward translocation of the candidate systemic compound. The two-spotted mite (2SM), *Tetracyshus telarious* (Linn.) and the bean aphid (BA), *Aphis fabae*, were employed in the test for systemic activity.

Young pinto bean plants in the primary leaf stage were used as host plants for the two-spotted mite. The pinto bean plants were placed in bottles containing 200 ml. of the test solution and held in place with cotton plugs. Only the roots were immersed. The test solutions were prepared by dissolving the compounds to be tested in a suitable solvent, usually acetone, and then diluting with distilled water. The final acetone concentration never exceeded about 1 percent. The toxicants were initially tested at a concentration of 10 parts per million (p.p.m.) Immediately after the host plant was placed in the test solution it was infested with the test species. Mortalities were determined after 7 days.

Young nasturtium plants were used as the host plants for the bean aphid. The host plants were transplanted into one pound of soil that had been treated with the candidate compound. Immediately after planting in the treated soil the plants were infested with the aphids. Concentrations of toxicant in the soil ranged from 10 p.p.m. per pound of soil downward until an LD–50 value was obtained. Mortality was recorded after 72 hours.

The percentage of kill of each test species was determined by comparison with control plants placed in distilled water or untreated soil. The LD-50 values were calculated. These systemic test results are reported in Table VI under the columns BA-sym and 2SM-sym.

TABLE VI

| Compound Number | HF g | LB % | BA % | BA-sym p.p.m. | 2 SM PE % | Eggs % | Sym. ppm |
|---|---|---|---|---|---|---|---|
| 1 | 30 | .008 | .003 | 1 | .003 | .03 | 0.5 |
| 2 | 80 | .008 | .030 | 3 | .008 | — | 0.5 |
| 3 | 30 | .005 | .008 | 0.8 | .001 | .008 | 0.3 |
| 4 | 30 | .030 | .030 | 3 | .001 | .005 | 3 |
| 5 | 10 | .005 | .050 | 3 | .001 | .01 | 1 |
| 6 | 10 | .001 | .003 | 0.3 | .001 | .008 | 0.1 |
| 7 | 30 |  | .003 | 0.8 | .0003 | .03 | 0.3 |
| 8 | 20 | .005 | .0005 | 0.8 | .003 | .003 | 0.5 |
| 9 | 15 | .010 | .003 | 3 | .003 | .003 | 0.5 |
| 10 | 50 | .030 | .008 | 3 | .005 | .030 | 0.8 |
| 11 | 50 | .050 | .008 | >10 | .003 | .050 | 3 |
| 12 | 30 | .050 | .003 | 1 | .003 | .030 | 0.8 |
| 13 | 30 | .050 | .003 | 1 | .003 | .030 | 1 |
| 14 | 30 | .008 | .005 | 3 | .001 | .030 | 0.8 |
| 15 | 50 | .050 | .008 | 1 | .005 | .030 | 1 |
| 16 | 30 | .008 | .003 | 0.8 | .003 | .008 | 0.8 |
| 17 | 30 | .300 | .003 | 1 | .005 | .030 | 0.8 |
| 18 | 8 | .008 | .003 | 0.8 | .001 | .008 | 0.5 |
| 19 | 50 | .030 | .003 | 3 | .003 | .003 | 1 |
| 20 | 30 | .010 | .003 | 3 | .003 | .003 | 0.8 |
| 21 | 50 | .010 | .005 | 0.8 | .003 | .008 | 0.8 |
| 22 | 80 | * | .030 | 3 | .003 | .008 | 1 |
| 23 | 30 | * | .003 | 0.3 | * | * | * |
| 24 | 30 | * | .005 | 3 | .003 | .30 | 0.8 |
| 25 | 50 | .003 | .008 | 3 | .005 | .03 | 3 |
| 26 | 20 | .008 | .003 | 3 | .005 | .008 | 0.5 |
| 27 | 30 | .030 | .003 | 3 | .005 | .030 | 3 |
| 28 | 20 | .010 | .003 | 0.8 | .005 | .008 | 0.4 |
| 29 | 30 | .050 | .008 | 1 | .003 | .008 | 0.8 |
| 30 | 30 | .010 | .008 | 1 | .003 | .008 | 0.8 |
| 31 | 50 | .050 | .008 | 3 | .003 | .008 | 0.8 |
| 32 | 30 | .030 | .008 | 3 | .003 | .008 | 0.8 |

*Not tested.

As those in the art are well aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clasy, diatomaceous earth, various flours such as walnut shell, wheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthlene sulfonate, sodium alkyl naphthlanee sulfonate, methyl cellulose, fatty alcohol ethers, polyglycol fatty acid esters and other polyoxyethylene surface active agents. The proportion of these agents commonly comprises 1-15 percent by weight of the pesticidal compositions although the proportion is not critical and may be varied to suit any particular situation.

I claim:

1. The method of killing acarids comprising applying thereto an acaricidally effective amount of a compound of the formula

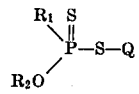

in which $R_1$ is selected from the group consisting of alkyl having from 1 to 4 carbon atoms and alkoxy having from one to four carbon atoms;

$R_2$ is an alkyl group having from one to four carbon atoms;

Q is a radical selected from the group consisting of:

(A) 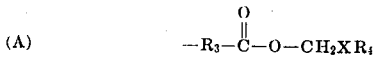

in which $R_3$ is an alkylene group having from one to four carbon atoms;

X is selected from the group consisting of thio and sulfinyl; and $R_4$ is an alkyl group having from one to four carbon atoms;

(B) 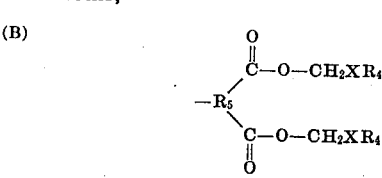

in which

X and $R_4$ are defined as above and $R_5$ is a trivalent saturated hydrocarbon group having from one to three carbon atoms;

(C) 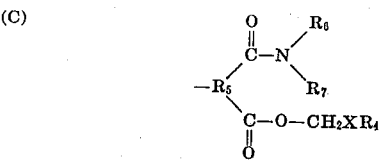

in which X, $R_4$ and $R_5$ are defined as above and $R_6$ and $R_7$ are independently selected from the group consisting of hydrogen; alkyl having from one to six carbon atoms and phenyl, and substituted derivatives thereof wherein the substituent is selected from the group consisting of chloro and cyano; and tetrahydrofurfuryl;

(D) 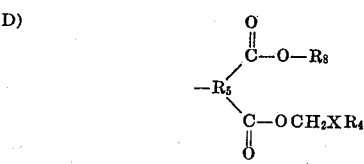

wherein X, $R_4$ and $R_5$ are defined as above and $R_8$ is selected from the group consisting of alkyl having from one to six carbon atoms and substituted derivatives thereof in which said substituents are selected from the group consisting of chlorine, phenyl and chlorophenyl; and (E) 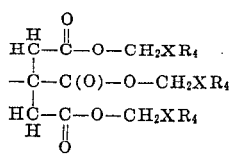

in which X and $R_4$ are as defined.

2. The method of claim 1 in which Q of said compound is the radical of subdivision (A).

3. The method of claim 1 in which Q of said compound is the radical of subdivision (B).

4. The method of claim 1 in which Q of said compound is the radical of subdivision (C).

5. The method of claim 1 in which Q, of said compound is the radical of subdivision (D).

6. The method of claim 1 in which Q of said compound is the radical of subdivision (E).

7. The method of claim 3 in which $R_1$ is ethoxy, $R_2$ is ethyl, $R_4$ is methyl, X is thio and $R_5$ is

8. The method of claim 3 in which $R_1$ is methoxy, $R_3$ is methyl, $R_4$ is methyl, X is thio and $R_5$ is

9. The method of killing insects comprising applying thereto an insecticidally effective amount of a compound of the formula

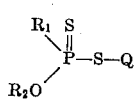

in which
$R_1$ is selected from the group consisting of alkyl having from 1 to 4 carbon atoms and alkoxy having from one to four carbon atoms;
$R_2$ is an alkyl group having from one to four carbon atoms;
Q is a radical selected from the group consisting of:

(A) $\quad -R_3-\overset{O}{\overset{\|}{C}}-O-CH_2XR_4$ in which
$R_3$ is an alkylene group having from one to four carbon atoms;
X is selected from the group consisting of thio and sulfinyl; and
$R_4$ is an alkyl group having from one to four carbon atoms;

(B) 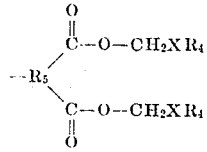

in which

X and $R_4$ are defined as above and
$R_5$ is a trivalent saturated hydrocarbon group having from one to three carbon atoms;

(C) 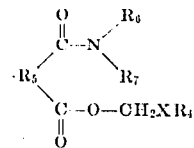

in which X, $R_4$ and $R_5$ are defined as above and $R_6$ and $R_7$ are independently selected from the group consisting of hydrogen; alkyl having from one to six carbon atoms and phenyl, and substituted derivatives thereof wherein the substituent is selected from the group consisting of chloro and cyano; and tetrahydrofurfuryl;

(D) 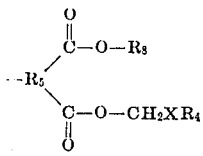

wherein X, $R_4$ and $R_5$ are defined as above and $R_8$ is selected from the group consisting of alkyl having from one to six carbon atoms and substituted derivatives thereof in which said substituents are selected from the group consisting of chlorine, phenyl and chlorophenyl; and (E) 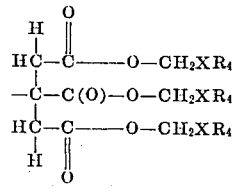

in which X and $R_4$ are as defined.

10. The method of claim 9 in which Q of said compound is the radical of subdivision (A).

11. The method of claim 9 in which Q of said compound is the radical of subdivision (B).

12. The method of claim 9 in which Q of said compound is the radical of subdivision (C).

13. The method of claim 9 in which Q of said compound is the radical of subdivision (D).

14. The method of claim 9 in which Q of said compound is the radical of subdivision (E).

15. The method of claim 11 in which $R_1$ is ethoxy, $R_2$ is ethyl, $R_4$ is methyl, X is thio and $R_5$ is

16. The method of claim 11 in which $R_1$ is methoxy, $R_2$ is methyl, $R_4$ is methyl, X is thio and $R_5$ is

* * * * *